UNITED STATES PATENT OFFICE.

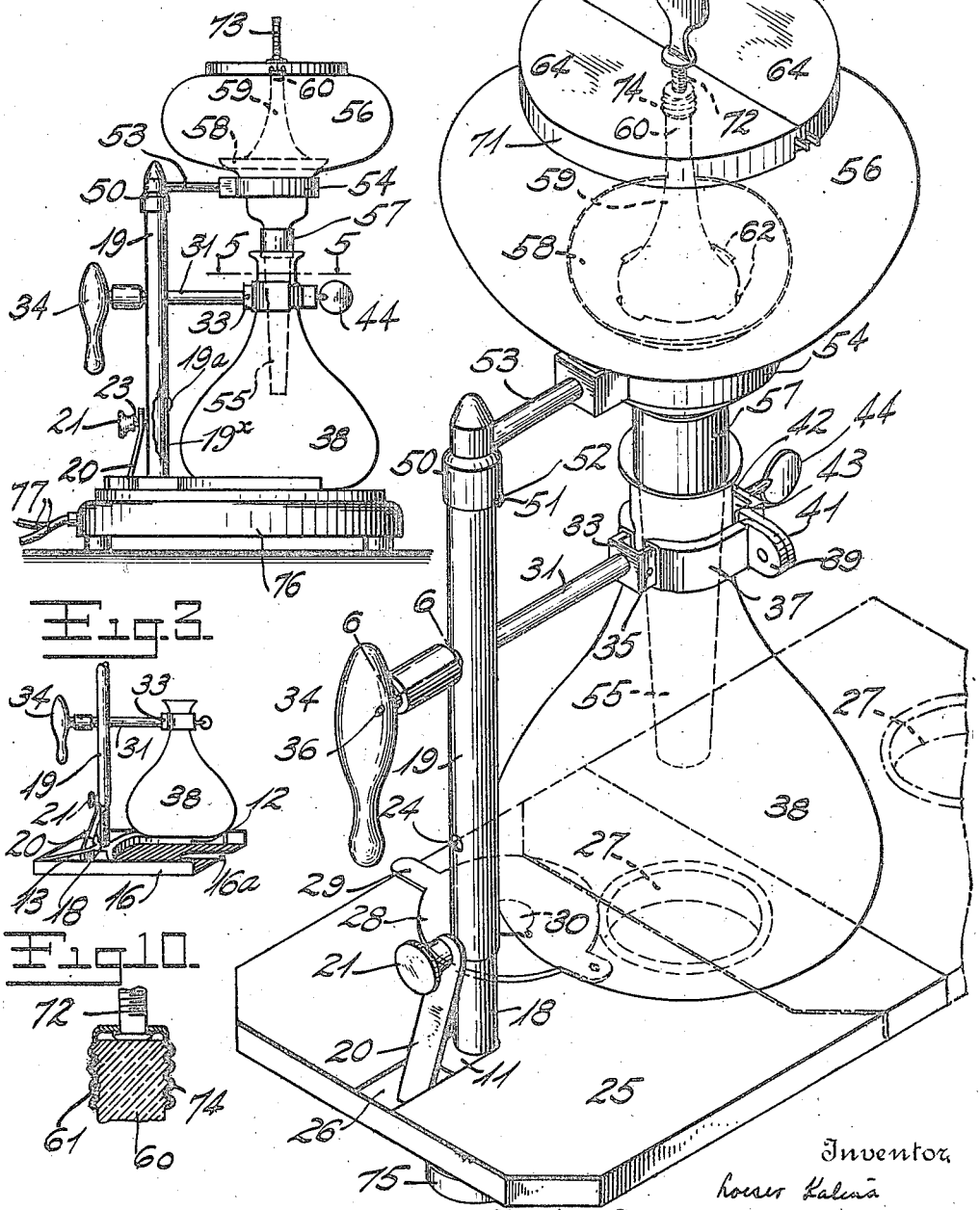

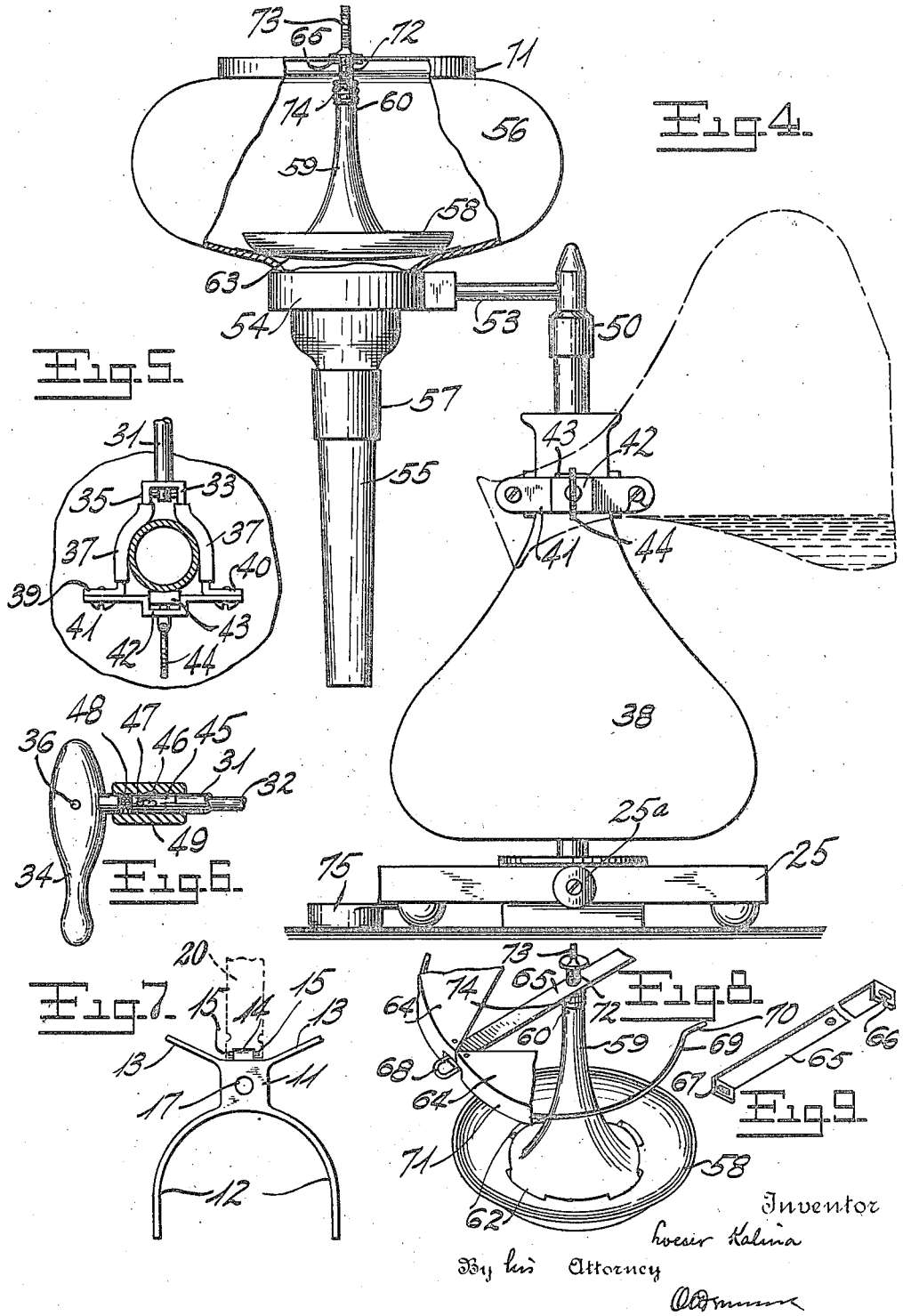

LOESER KALINA, OF BROOKLYN, NEW YORK.

PERCOLATOR.

1,232,808. Specification of Letters Patent. Patented July 10, 1917.

Application filed April 21, 1916. Serial No. 92,573.

*To all whom it may concern:*

Be it known that I, LOESER KALINA, a citizen of the United States of America, residing at Brooklyn, in the county of Kings and State of New York, have invented certain new and useful Improvements in Percolators, of which the following is a specification.

My invention relates to improvements in coffee-urns, of the type generally termed percolators.

One of the objects of the invention is to so construct the percolator that it may, with equal facility, be used either with alcohol, gas, or electricity or any other heating agent, no change in the structure being required to render the device properly usable with any of these heating media.

Another object of the invention consists in constructing and arranging the parts in such manner that the coffee may be poured or decanted from the bowl without removing the latter from the support which retains it during the boiling operation.

A further object of the invention relates to the structure and correlation of parts whereby the percolator as a whole, may be moved from place to place, without danger of parts becoming separated or dropping out of place.

A still further object is to provide means whereby, when the funnel used in my filter is moved out of engagement with the bowl, drippings will be prevented from soiling the linen or other object upon which the percolator may be placed.

It is also, an object of the invention to connect the filter and the cover of the infuser together, so that these parts may be handled as an entirety, and to make the filter of glass, which has not been heretofore done so far as I am aware, so that the greatest possible degree of cleanliness is attained. By suitably connecting the filter with the cover, the filter may be forced into proper position, despite irregularities in the thickness or contour of the glass of which the filter is constructed.

Other objects of the invention, and its several advantages and detail construction, will be fully described in the following specification, reference being had to the accompanying drawings, in which—

Figure 1 is a perspective view of the improved percolator, the sliding cover for the base being shown extended, in dotted lines;

Fig. 2 is a side elevational view, illustrating the percolator resting on an electric heater;

Fig. 3 is a fragmentary side elevational view, on a somewhat reduced scale, illustrating the bowl in readiness to have its contents decanted after boiling over a fire of gas, electricity, or coal;

Fig. 4 is a side elevational view, partly in section and with part of the infuser broken away, illustrating the position of the parts during decanting of the coffee;

Fig. 5 is a vertical sectional view on the line 5—5 of Fig. 2;

Fig. 6 is a longitudinal sectional view on the line 6—6 of Fig. 1;

Fig. 7 is a plan view of the casting or bracket by which the device, as a whole, is carried;

Fig. 8 is a perspective view of the strainer, with fragments of the sectional cover shown in open position;

Fig. 9 is a detail view of a part of the cover; and

Fig. 10 is a detail sectional view illustrating the manner in which the cover and strainer are connected together.

It is desirable to mount the percolator upon a suitable supporting bracket or casting, and while any appropriate form will answer the purpose, that shown in Fig. 7 has been found most suitable in practice. This bracket comprises the intermediate web portion 11, the forwardly extending curved arms 12, and the rearwardly extending, diverging prongs 13, between which is provided a lug 14 having the oppositely extending gudgeons 15, for a purpose to be described.

The supporting bracket, above described, may be slid into and out of an appropriately shaped pan 16, a portion of which is cut away at $16^a$ to accommodate a suitably shaped alcohol cup. When the coffee is to be boiled by means of either liquid or solidified alcohol the bracket is not removed from the pan, but when gas, coal, or electricity is the heating medium the bracket with the parts it supports is moved out of the pan and over the heating agent, and when the coffee has been made, the bracket is replaced in the pan 16 so that the device may be placed on a polished table without injuring the latter.

The web 11 of the supporting bracket is provided with an orifice 17 to receive and rigidly retain one end of a pillar 18, upon which a sleeve 19 is mounted so as to be capable of vertically sliding thereon. Rotation of the sleeve 19 about the pillar 18 is prevented by a pin or screw 19ᵃ engaging the pillar 18 and projecting through a slot 19ˣ formed lengthwise in the sleeve 19. The sleeve 19 may be held either in the raised position shown in Figs. 1 and 3, or in the lowered position shown in Fig. 2, by means of a pawl or latch 20, provided with the button handle 21. The latch 20 is pivotally supported by the gudgeons 15 (Fig. 7), and the pin 23 projecting from the button 21 is adapted to engage beneath the lower edge of the sleeve 19 when the latter is to be held elevated, or to fall into an orifice 24 intermediate the ends of the sleeve when said sleeve is to be retained in its lowermost position.

Adapted to slide telescopically on the pan 16 is a cover 25 having a longitudinal slot 26 at its rear end to accommodate the pillar 18 and latch 20. Near its forward end, the cover 25 is provided with an opening 27 to receive a cup (not shown) into which alcohol, either liquid or solidified as desired, may be placed. The cover may be moved back and forth on the pan 16 by means of a handle or button 25ᵃ. Pivotally mounted on the cover 25 adjacent the opening 26 is a lid 28 provided with the finger piece 29 for operating the same. Pivoted on the lid 28 at about its center is what may be termed a supplemental lid 30 which is designed to cover and uncover an opening (not shown) formed in the center of the main lid 28. The object of providing the lid 30 and the opening thereunder is to permit the use of a regulated small flame under the bowl, a smaller and more centralized flame than could be obtained by the mere adjustment of the main lid 28 over the cup in the opening 27.

Rigidly secured in the sleeve 19, and extending therethrough at right angles to its axis, is a tube 31 which houses a rod 32, carrying at one end a yoke designated generally as 33, and at its opposite end a handle 34. The yoke is connected with the rod by means of the pin 35, and the handle 34 is connected with the rod by means of the pin 36. The yoke has its diverging arms covered with a cushioning material, 37, such as rubber, and is designed to receive the contracted neck of the bowl or water container 38. The arms of the yoke are turned to form the angular portions 39 and 40, to one of which, for example 39, is pivoted the keeper 41. Intermediate its ends the keeper is squared as at 42 to accommodate a cushioning follower 43 which may be forced against the bowl-neck by means of the screw 44. Inasmuch as the follower 42 is made of yielding material it may be forced fairly tightly against the neck of the bowl, without injuring the neck or the bowl, both of which are usually and preferably of glass.

The end of the tube 31 adjacent the handle 34 is formed as a clutch, as shown in Fig. 6, in order that the rod 32 may either be turned about its own axis, or prevented from turning in the tube 31. The end of the tube which extends toward the handle 34 is cut away or stepped, and immediately adjacent the stepped end of the tube 31 is a complementally stepped short length of tube 45 which surrounds the end of the rod 32. The tube section 45 is provided with a slot 46 into which projects a pin 47 traversing the rear end of the rod 32. Interposed between the rear end of the tube section 45 and the handle 34, and surrounding the rod 32, is a coiled spring 48, the tendency of which is to force the stepped end of tube length 45 into engagement with the stepped rear end of the tube 31. The pin 47 passes into a relatively short sleeve 49 which embraces the tube length 45, the spring 48, a part of the tube 31 and a part of the handle 34. By moving the sleeve 49 in a direction to compress the spring 48 the tube length 45 is moved out of engagement with the stepped end of the tube 31 and the rod 32 may be axially rotated by means of the handle 34. When the tubes 31 and 45 are moved so that their stepped parts are in alinement the spring 48 will force the tube 45 into clutching engagement with tube 31 preventing rotation of the rod 32.

Carried at the top of the sleeve 19, and capable of rotating about the same to a limited extent, is a cap 50, the rotary movement of which is limited by pins 51 projecting from the sleeve 19 into the lower undercut edge 52 of said cap. The cap has rigidly attached thereto or formed as an integral part thereof a bar or rod 53 which carries at its free end a supporting annulus 54 for the funnel 55 of the infuser 56. The funnel 55 is provided near its upper portion with a collar 57 of rubber or like material to act as a cushion when the funnel 55 is placed into the neck of the bowl 38, as shown in Figs. 1 and 2.

The infuser 56 is substantially of spheroid shape, having slightly flattened ends. Adapted to rest on the lower flattened end of the infuser, within the latter, is a strainer which is shown in detail in Fig. 8, and comprises the cup member 58, the substantially conical member 59, and the upwardly projecting stem 60 which is exteriorly threaded as shown at 61 (Fig. 10). These several parts of the strainer are preferably integral, and where the cone 59 merges into the cup 58 the latter is provided with a series of openings 62 to allow for the passage of liquid from the infuser 56 into the bowl 38. In practice it is customary to interpose between the bottom of the strainer cup 58 and the upper end of the funnel 55 a sheet or pad of straining material 63 which may be felt, wool or the like.

I have found it convenient in practice to connect the cover for the infuser with the strainer, as I find that this arrangement greatly facilitates handling the parts.

The upper part of the infuser is provided with a vertical flange designed to be engaged by the sectional cover 65, this cover comprising the wings 64 which are pivoted to one end of a bar 65, the opposite end of which has a depending bifurcated end 66. Opposite the end 66, the bar is provided with an angular pendant lug or end 67 adapted to receive the bight 68 of a wire loop 69, the two arms of which are formed with the projecting ends 70 which may be moved into and out of engagement with the bifurcated ends 66 of the bar 65. It will be understood that the wire members 69 are arranged within the flanges 71 of the cover 64, and that the wire 69 is resilient or springy, so that this wire may be used to open and close the cover sections 64.

Passing through approximately the central part of the bar 65 is a screw 72, provided with an enlarged operating head 73 at one of its ends, and having an internally threaded socket 74 at its opposite end, this socket being adapted to engage the threaded end 61 of the stem 60 of the strainer. By this arrangement the cover and the strainer are removably connected together, and despite any irregularities in the thickness of the glass of the strainer, the latter may be properly seated over the opening leading to the funnel 55.

Pivoted below the pan 16 is a drip cup 75 which may be moved about its pivot so that it is positioned either under the lower end of the funnel 55 to receive drippings therefrom, or to remain concealed beneath the pan 16.

In Fig. 2, the device is illustrated as being used in connection with an electric heater 76 of any approved type, provided with the wires 77 by means of which it is connected to the current supply.

This device has several operating capabilities, as suggested above, and I will now describe the several ways in which the device may be used.

Preliminary to such description, it will be understood that irrespective of the heating medium used, the procedure is to first place the desired quantity of preferably powdered coffee into the infuser after the strainer has been properly positioned. The cover 64 is then closed. Thereafter a suitable amount of water is placed into the bowl 38, and the parts so adjusted that the funnel 55 depends within the neck of the bowl 38, the general arrangement of the parts then being as illustrated either in Fig. 1 or in Fig. 2.

If it be assumed that solidified or liquid alcohol is the heating medium, the parts will appear as shown in solid lines (Fig. 1). The alcohol is placed into the cup which fits into the opening 27 in the cover 25, and the latter is slid back as far as it will go. The sleeve 19 is raised so that its lower edge rests upon the pin 23 and the flame from the ignited alcohol will cause the water in the bowl 38 to boil, to rise into the infuser 56, to pass over and through the coffee therein and then to drip or trickle in the form of coffee essence through the funnel 55 back into the bowl 38. When the coffee is as strong as desired, the burning alcohol may either be entirely extinguished by moving the lid 28 over the opening 27, or if it is desired to keep the coffee in the bowl 38 hot a small flame may be kept in use by suitably adjusting the supplemental lid 30.

If it be desired to decant the coffee from the bowl 38, the latter need not be removed from the yoke 37. It is merely necessary to raise the funnel so that it clears the top of the bowl 38, and swing the bar 53 in a semi-circle, until the lower end of the funnel is in line with the drip cup 75 which has been moved outwardly in proper position to receive the drippings from the funnel. Then move the sleeve 49 toward the handle 34 whereby the tube section 45 is unclutched from the tube 31 permitting the rod 32 to be rotated. By manipulating the handle 34 the bowl 38 may be moved into the position shown in dotted lines in Fig. 4 so that the coffee may be decanted from the bowl 38. To boil coffee anew the several parts are then restored to their initial position as shown in Fig. 1.

If the coffee is to be boiled on a gas stove or coal stove, it is obvious that the pan 16 and the cover 25 are not needed during the boiling operation, and therefore the cover 25 is first removed, and then the bracket 11—13 with the parts it supports is placed on the fire so that the bowl 38 is supported in a position to be in direct line with the heat or flame issuing from the fire. After the coffee has been boiled, the device is grasped by the handle 34, which it will be remembered is held against turning by the clutch 45—31, and replaced in the pan 16. While the bracket 11—13 is hot, the pan 16 will prevent the heat from being communicated to any object upon which the device may be then placed, so that such object as a table or the like, will not be injured. To decant the coffee the same operations are gone through as above described in connection with coffee boiled over an alcohol flame.

In Fig. 2 the device is shown as being placed on an electric heater 76 and for that purpose the bracket 11—13 is moved out of the pan 16 and placed directly on the heater 76.

From the foregoing description it will be noted that I have provided a device which may be equally well used with gas, a coal or wood fire, electricity, or alcohol in either liquid or solid form.

Furthermore to decant the coffee it is not necessary to remove the bowl 38 in which the coffee is contained from its support, but that such support with the bowl therein may be bodily turned so as to pour the desired quantities of coffee from the bowl. In this way I avoid the difficulty present in so many percolators of handling the hot coffee bowl.

Soiling of linen is avoided by the provision of the drip cup adapted to be alined under the funnel end, and injury to furniture is prevented by the provision of the pan 16 into which the hot bracket 11—13 may be placed. Owing to the construction and arrangement of the sliding cover 25, when alcohol is used as the heating medium, the alcohol lamp may be either entirely removed from under the bowl 38 by sliding the cover 25 outwardly as shown in dotted lines in Fig. 1, or the flame may be extinguished by moving the cover 28 over the alcohol lamp, or a flame of practically any desired size may be allowed to play upon the bottom of the bowl 38 by suitable adjustment of the supplemental cover 30.

What I claim as new and desire to secure by Letters Patent is:—

1. In a coffee percolator, the combination of a supporting pillar, a sleeve slidable thereon, means passing through said sleeve and adapted to support a bowl, means at one end of said sleeve for supporting an infuser, and means for retaining this sleeve in adjusted position relatively to said pillar.

2. In a coffee percolator, the combination of a supporting pillar, a sleeve slidable thereon, a rod passing through said sleeve and adapted to support a bowl, means at one end of said pillar for supporting an infuser, and means for holding said rod against axial rotation.

3. In a coffee percolator, the combination of a supporting pillar, a sleeve slidable thereon, a rod passing through said sleeve and adapted to support a bowl, means at one end of said pillar for supporting an infuser, and clutch mechanism whereby said rod is either held against axial rotation or is free to rotate axially.

4. In a coffee percolator, the combination of a supporting bracket, a pillar projecting upwardly therefrom, a sleeve slidable on said pillar, means carried by said sleeve for supporting an infuser, means carried by said sleeve for supporting a bowl, a pan in which said bracket may be removably placed, and a cover slidable on said pan to cover said bracket.

5. In a coffee percolator, the combination of a supporting bracket, a pillar projecting upwardly therefrom, a sleeve slidable on said pillar, means carried by said sleeve for supporting an infuser, means carried by said sleeve for supporting a bowl, a pan in which said bracket may be removably placed, a cover slidable on said pan to cover said bracket, and means in said cover for receiving a suitable heating medium to heat the contents of said bowl.

6. In a coffee percolator, the combination of a supporting bracket, a pillar projecting upwardly therefrom, a sleeve slidable on said pillar, means carried by said sleeve for supporting an infuser, means carried by said sleeve for supporting a bowl, a pan in which said bracket may be removably placed, a cover slidable on said pan to cover said bracket, and means pivotally supported by said bracket for engagement with said sleeve to retain the same in adjusted position on the pillar.

7. In a coffee percolator, the combination of a pillar, a sleeve slidable on said pillar, a tube rigid with and extending through said pillar, a bowl supporting member at one end of said tube, a rod passing through said tube and engaging said bowl supporting member to operate the same, a handle at the opposite end of said rod, clutch mechanism intermediate said handle and one end of said tube whereby said rod may either be freely rotated or is held against rotation, and means on said sleeve for supporting an infuser.

8. In a coffee percolator, the combination of a supporting pillar, a sleeve slidable on said pillar, bowl supporting means carried by said sleeve, infuser supporting means carried by said sleeve, an infuser in said last mentioned supporting means, a strainer adapted to rest in said infuser, and a lid for said infuser removably connected to said strainer.

9. In a coffee percolator, the combination of a supporting pillar, a sleeve slidable on said pillar, bowl supporting means carried by said sleeve, infuser supporting means carried by said sleeve, an infuser in said last mentioned supporting means, a strainer adapted to rest in said infuser, and a lid for said infuser removably connected to said strainer, said strainer comprising a cup member having perforations therein, a cone member integral with said cup and an upwardly projecting stem integral with said cone.

10. In a coffee percolator, the combination of a supporting pillar, a sleeve slidable on said pillar, bowl supporting means carried by said sleeve, infuser supporting means carried by said sleeve, an infuser in said last mentioned supporting means, a strainer adapted to rest in said infuser, and a lid for said infuser removably connected to said strainer, said strainer comprising a cup member having perforations therein, a cone member integral with said cup and an upwardly projecting stem integral with said cone, and said cover having an internally threaded depending socket adapted to engage the threaded end of the stem of said strainer.

11. In a coffee percolator, the combination of a supporting pillar, a sleeve slidable on said pillar, bowl supporting means carried by said sleeve, infuser supporting means carried by said sleeve, an infuser in said last mentioned supporting means, a strainer adapted to rest in said infuser, a lid for said infuser removably connected to said strainer, said cover comprising a transverse bar having cover sections pivotally mounted thereon, and means on said bar for retaining said cover sections in closed position.

12. In a coffee percolator, the combination of a supporting pillar, a sleeve slidable on said pillar, bowl supporting means carried by said sleeve, infuser supporting means carried by said sleeve, an infuser in said last mentioned supporting means, a strainer adapted to rest in said infuser, a lid for said infuser removably connected to said strainer, said lid comprising a transverse bar having one end bifurcated and also having lid sections pivotally mounted thereon, means on said bar for retaining said lid sections in closed position, said last named means comprising a spring member within said lid sections having projecting ends adapted to engage the bifurcated end of said transverse bar.

13. In a coffee percolator, the combination of a supporting bracket, having gudgeons formed thereon, a pillar carried by said bracket, a sleeve slidable on said pillar, a pawl pivotally mounted on said gudgeons and adapted to retain the same in adjusted position on the pillar, a tube extending at right angles to said sleeve, a yoke at one end of said tube, a keeper pivoted to said yoke, a cushioning follower movably supported by said keeper and adapted to move into and out of engagement with the neck of a bowl, a cap revolubly mounted at the inner end of said sleeve, a bar projecting from said cap, and a supporting annulus carried at one end of said bar and adapted to support an infuser.

14. In a coffee percolator, the combination of a supporting bracket having gudgeons formed thereon, a pillar carried by said bracket, a sleeve slidable on said pillar, a pawl pivotally mounted on said gudgeons and adapted to engage said sleeve to hold the same in vertically adjusted position on the pillar, a tube integral with and extending at right angles to said sleeve and having one of its ends stepped, a rod passing through said tube, a bowl supported at one end of said rod, a handle at the opposite end of said rod, a stepped tube section on said rod adjacent said handle, said tube section having a slot therein, a pin traversing said rod and projecting into said slot, a coiled spring interposed between said handle and said tube section and tending to force the stepped portion of the latter into engagement with the stepped portion of said tube, and an infuser supported relatively to said bowl.

In testimony whereof I have affixed my signature in presence of two witnesses.

LOESER KALINA.

Witnesses:
 CLARICE FRANCK,
 JUDITH PARDEE.